United States Patent [19]
Hong

[11] Patent Number: 5,641,902
[45] Date of Patent: Jun. 24, 1997

[54] TIRE VALVE CAP PRESSURE GAUGE

[76] Inventor: Jong Un Hong, 13740 Oak Crest Dr., Cerritos, Calif. 90703

[21] Appl. No.: 648,439

[22] Filed: May 15, 1996

[51] Int. Cl.$^6$ ................................................ B60C 23/02
[52] U.S. Cl. ........................................ 73/146.8; 116/34 R
[58] Field of Search ........................... 73/146.8; 116/34 R

[56] References Cited

U.S. PATENT DOCUMENTS

| | | | |
|---|---|---|---|
| 4,072,048 | 2/1978 | Arvan | 73/146.8 |
| 4,103,549 | 8/1978 | Schmidt . | |
| 4,174,673 | 11/1979 | Tung et al. . | |
| 4,464,929 | 8/1984 | Willis | 116/34 R |
| 5,115,832 | 5/1992 | Higdon et al. . | |

*Primary Examiner*—Elizabeth L. Dougherty
*Assistant Examiner*—Joseph L. Felber

[57] ABSTRACT

The present invention a tire valve cap pressure gauge comprises a hollow, cylindrical cap made of transparent material and having a series of pressure level markings, an inner piece and a valve stem. The inner piece having a cap top at its top end and a cap pin at its lower end is concentrically placed in the cylindrical cap, which is made of transparent material, and an inflatable diaphragm is internally attached to the inner piece and the cylindrical cap. The cap is then threadably attached to a valve stem found on typical tire, whereupon depressing the top portion of the inner piece causes the lower end of the inner piece to depress valve core inside the valve stem and thereby releasing the air inside the tire which in turn inflates the diaphragm. An indicator freely placed on the diaphragm rises with the inflating diaphragm and gives a tire pressure reading.

7 Claims, 2 Drawing Sheets

TIRE VALVE CAP PRESSURE GAUGE

CROSS-REFERENCE TO RELATED APPLICATION

This is a patent application of my disclosure filed under Document Disclosure Program with Document Disclosure No. 390,981, filed on Jan. 24, 1996, entitled "Tire Valve Cap Pressure Gauge".

BACKGROUND OF THE INVENTION

1. Field of the Invention

The present invention generally relates to a pressure indicating apparatus and particularly to a tire pressure gauge.

2. Description of the Prior Art

Maintaining vehicle tire pressure to that specified by the tire manufacturer is significant in preventing accidents and premature wear. Service and gas stations traditionally have had an air pump with a tire pressure gauge built within available to motorists. However, it has become far too common that those devices are either not available or malfunctioning or are coin-operated. While it is true that many motorists own and utilize their own tire pressure gauge, it is often misplaced.

The prior art discloses tire pressure indicating apparatus of various designs and means: U.S. Pat. No. 4,103,549 to Schmidt discloses a tire valve cap with pressure indicator comprising a housing with spring-loaded diaphragm piston exposed to the tire pressure; U.S. Pat. No. 4,174,673 to Tung et al. discloses a low pressure warning tire air valve cap comprising a cylindrical body, a piston disposed therein, a deformable and a perforated diaphragm; and U.S. Pat. No. 5,115,832 to Higdon et al. discloses a tire pressure gauge and cap apparatus comprising a body tube to be secured to the valve of a conventional tire. Although these prior art patents disclose various tire pressure indicating methods and devices, none of them disclose a tire pressure gauge of the particular type as disclosed and claimed hereinafter.

It is thus a primary objective of the present invention to provide a tire valve cap pressure gauge which has a self-contained pressure indicator.

Another objective of the present invention is to provide a tire valve cap pressure gauge which utilizes a transparent housing having a scale for ready-viewing of pressure level.

Yet another objective of the present invention is to provide a tire valve cap pressure gauge which utilizes an inflatable diaphragm.

Still another objective of the present invention is to provide a tire valve cap pressure gauge which prevents air leakage in the event of valve cap damage.

SUMMARY OF THE INVENTION

The present invention is directed to a tire valve cap pressure gauge which comprises a hollow, cylindrical cap made of transparent material and having a series of pressure level markings, an inner piece and a valve stem. The inner piece has a cap top at its top end and a cap pin at its lower end which is concentrically placed in the cylindrical cap. The cap is made of transparent material, and an inflatable diaphragm is internally attached to the inner piece and the cylindrical cap. The cap is then threadably attached to a valve stem found on typical tire, whereupon depressing the top portion of the inner piece causes the lower end of the inner piece to depress valve core inside the valve stem and thereby releasing the air inside the tire which in turn inflates the diaphragm. An indicator on the diaphragm rises with the inflating diaphragm and gives a tire pressure reading.

These together with other objects of the invention are pointed out clearly in the claims annexed to and forming a part of this disclosure. For a better understanding of the present invention, its operating advantages and the specific objects attained by its use, reference should be made to the accompanying drawings and descriptive matter in which there are illustrated preferred embodiments of the invention.

BRIEF DESCRIPTION OF THE DRAWINGS

For a better understanding of the principle and nature of the present invention, references should be made to the following detailed description taken in consideration of the accompanying drawings in which.

DETAILED DESCRIPTION OF THE PREFERRED EMBODIMENT

Figure 1:
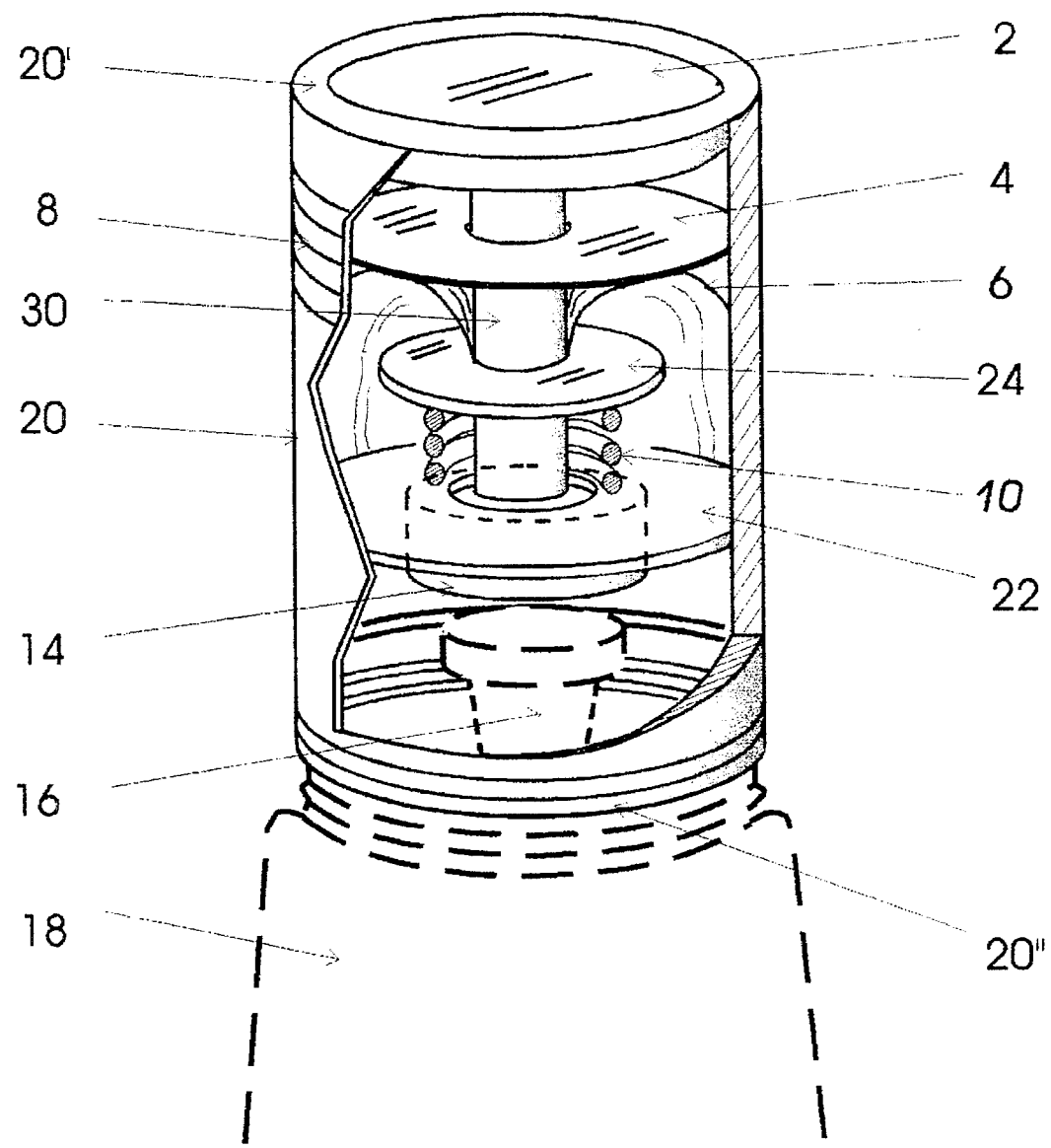
FIG. 1 is an elevational perspective view of the present invention with parts broken away showing all the elements.

Referring to FIG. 1, the present tire valve cap pressure gauge comprises as major components a hollow, cylindrical cap 20, an inner piece 30 and a valve stem 18.

Figure 2:
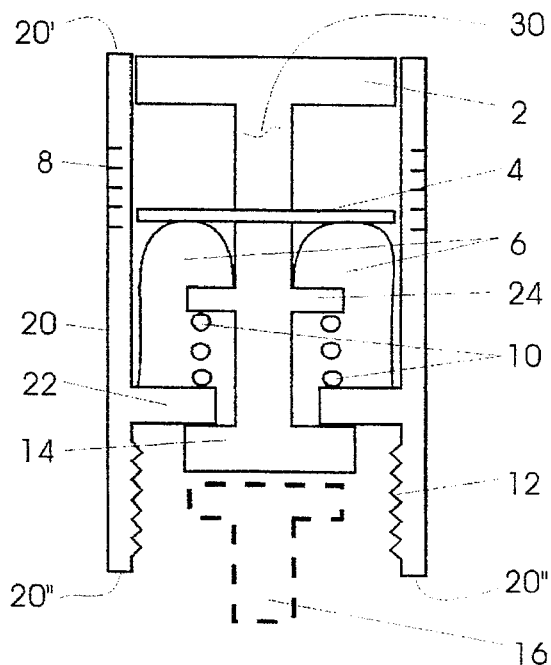
FIG. 2 is a side, sectional view of the present invention illustrating the cap pin, valve core, inflatable diaphragm, and indicator.

The cylindrical cap 20 is made of transparent material and has a first end 20' and a second end 20". As shown in FIG. 2, an internal thread 12 is formed at the second end 20" and an internal shoulder 22 is formed above the internal thread 12. A series of vertical markings or pressure scales 8 is externally notched on portion of the cap 20 between the internal shoulder 22 and the first end 20'.

The inner piece 30 has a cap top 2 formed at its upper end, a rib 24 formed at its mid portion and a cap pin 14 formed at its lower end. The inner piece 30 is placed concentrically in the cap 20 so that the cap top 2 fits flush to the first end 20'. In this position, the internal shoulder 22 is placed between the rib 24 and the cap pin 14. A spring 10 may be placed in between the rib 24 and the internal shoulder 22. An inflatable diaphragm 6 is sealably attached to the rib 24 and to the internal shoulder 22 and a flat annular, donut-shaped indicator 4 is placed above and on the diaphragm 6.

The valve stem 18 typically found on vehicle tires has a valve core 16 in it. Depressing the valve core 16 releases the air in the tire.

Figure 3:
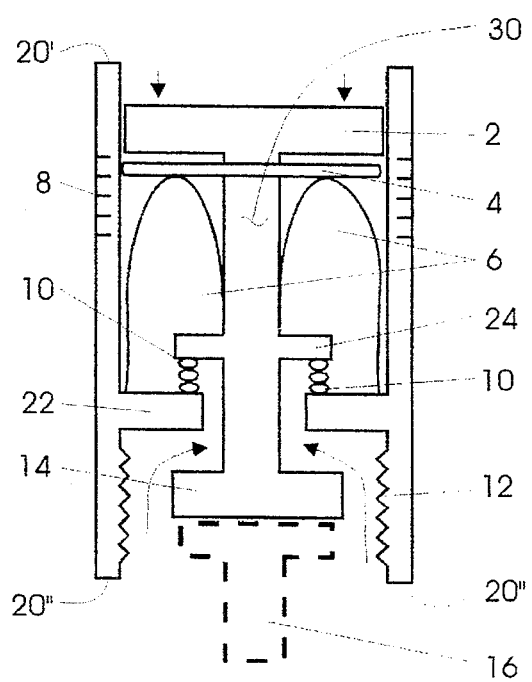
FIG. 3 is a side, sectional view of the present invention illustrating the depressed inner piece in turn depressing the valve core and thereby releasing the tire air.
Figure 4:
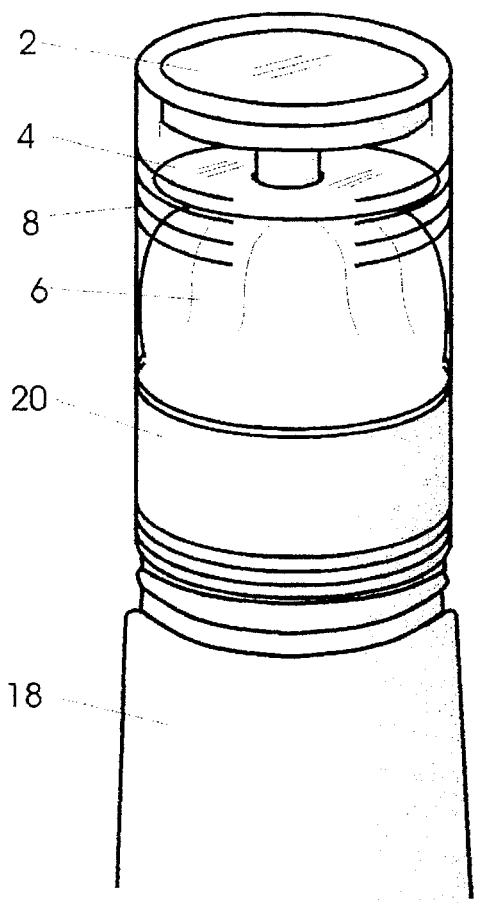
FIG. 4 is an elevational perspective view of the present invention showing the inflatable diaphragm within the transparent cap.

In operation, the cap 20 is threadably attached to the valve stem 18, as shown in FIG. 4. In this position, the cap pin 14 is not in contact with the valve core 16. When the cap top 2 is pressed down, the cap pin 14 presses down on the valve core 16, as illustrated in FIG. 3, and therefore the air inside the tire is released. However, the released air is trapped within the diaphragm 6 and inflates the diaphragm 6. The diaphragm 6 has been pre-calibrated so that the inflation of diaphragm 6 by the released air and therefore the rising of the indicator 4 freely placed on the diaphragm 6 places the indicator 4 on a level with the appropriate pressure scale 8. The motorist then can take a reading of tire pressure.

Not only can tire pressure readings be done conveniently and without the aid of separate tire pressure gauge, but the common occurrence of air leaking through the valve stem 18 is effectively prevented with the present invention.

While the present invention has been disclosed with reference to a particular example of preferred embodiment, it is the applicant's intention to cover all modifications and equivalents within the scope of the following appended claims. It is therefore requested that the following claims be given a liberal interpretation which is within the spirit and scope of the applicant's contribution to this art.

What is claimed as being new and therefore desired to be protected by Letters Patent of the United States is as follows:

1. A tire valve cap pressure gauge comprising:

a hollow cylindrical cap having a first end and a second end, said cylindrical cap being made of transparent material, a plurality of pressure scale markings on said cylindrical cap, an internal thread formed within said cylindrical cap at said second end thereof for mounting on a valve stem typically found in a vehicle tire having a valve core, and an internal shoulder formed within said cylindrical cap adjacent said second end;

an inner piece, said inner piece having a cap top formed at an upper end thereof, a rib formed on said inner piece at a mid-portion thereof and a cap pin formed on said inner piece at a lower end thereof;

a spring, said spring being placed between said rib and said internal shoulder; and an inflatable diaphragm and an annular indicator, said inflatable diaphragm being sealably attached to said rib and to said internal shoulder and said indicator rests on said diaphragm.

2. The tire valve cap pressure gauge as set forth in claim 1, wherein threadably attaching said cap to said valve stem prevents tire air leakage through said valve stem.

3. A tire valve cap pressure gauge comprising:

a tubular cap having a first end and a second end, said tubular cap being made of transparent material, a plurality of pressure value markings on said tubular transparent cap, means on said cap for attaching said cap to a tire valve stem having a valve core;

an inner piece movably positioned within said tubular cap, said inner piece having a cap pin in alignment with the valve core when said tubular cap is attached to a vehicle tire valve stem so that movement of said inner piece within said tubular cap engages the valve core, manually engageable means on said inner piece for urging said inner piece in the direction to actuate the valve core;

a flexible diaphragm within said tubular cap, said flexible diaphragm being sealed with respect to said tubular cap and with respect to said pin so that when said pin actuates said valve core, said diaphragm is deflected proportionately to the pressure therein so that an indicator position can be read against said markings on said tubular cap to indicate pressure in the tire.

4. The tire valve cap pressure gauge of claim 3 wherein there is an annular indicator within said tubular cap, said diaphragm engaging against said annular indicator to move said annular indicator to a pressure indicating position with respect to said marks.

5. The tire valve cap pressure gauge of claim 4 further including a spring engaged between a cap top and said pin to resiliently urge said pin in a direction away from actuation of the valve core.

6. The tire valve cap pressure gauge of claim 3 further including a spring engaged between a cap top and said pin to resiliently urge said pin in a direction away from actuation of the valve core.

7. The tire valve cap pressure gauge of claim 6 wherein there is an internal shoulder within said tubular cap and there is a rib on said pin, said spring being engaged between said shoulder and said rib.

* * * * *